(No Model.)

C. L. COMEAUX.
SUGAR CANE CART.

No. 509,425. Patented Nov. 28, 1893.

Witnesses.
A. Ruppert,
G. B. Towles.

Inventor:
Cyprien L. Comeaux
Per
Thomas P. Simpson
Atty.

UNITED STATES PATENT OFFICE.

CYPRIEN LUCAS COMEAUX, OF BAYOU GOULA, LOUISIANA.

SUGAR-CANE CART.

SPECIFICATION forming part of Letters Patent No. 509,425, dated November 28, 1893.

Application filed September 7, 1893. Serial No. 484,967. (No model.)

*To all whom it may concern:*

Be it known that I, CYPRIEN LUCAS COMEAUX, a citizen of the United States, residing at Bayou Goula, in the parish of Iberville and State of Louisiana, have invented certain new and useful Improvements in Sugar-Cane Carts; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a sugar cane planter which will avoid loss by dumping and will prevent the usual snatching and pulling up of cane by the carriers and droppers, and which will render unnecessary the carrying of muddy wet cane together with the breaking off of sprouts and eyes.

Figure 1:
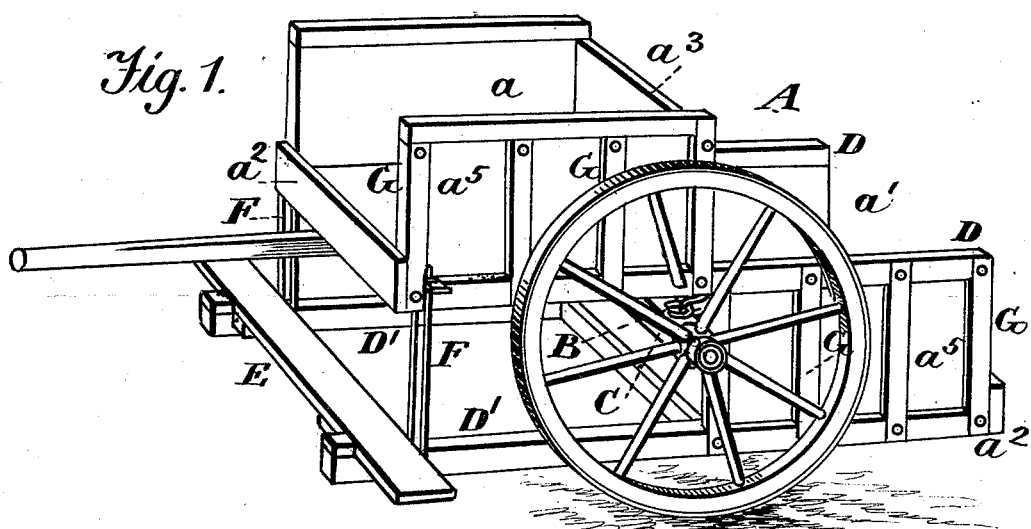
Figure 2:
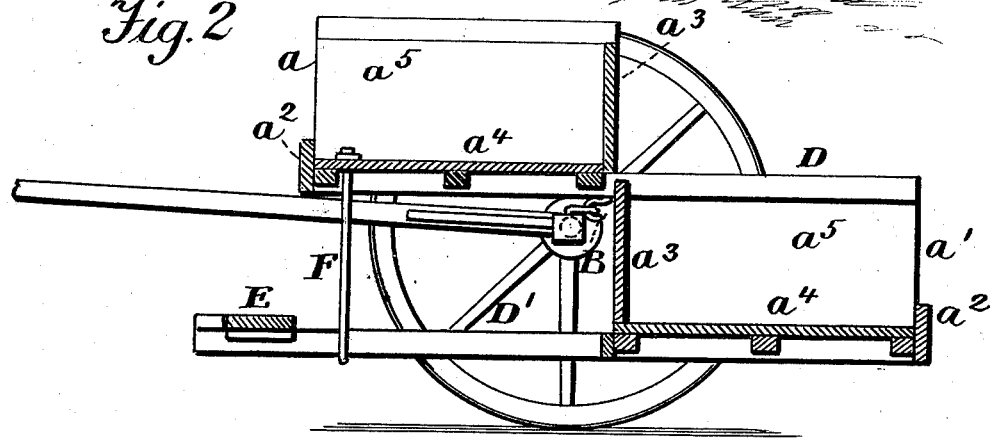
Figure 3:
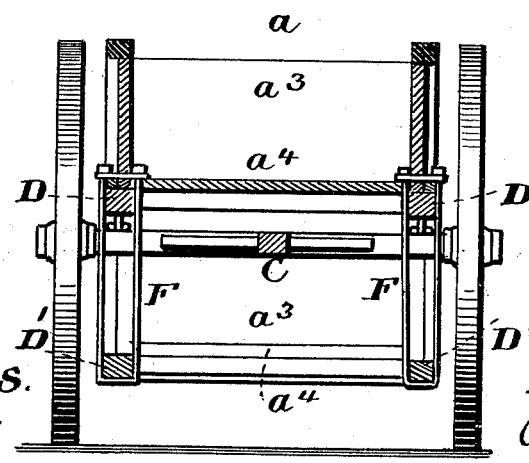

Figure 1 of the drawings is a perspective view; Fig. 2 a longitudinal vertical section, and Fig. 3 a vertical cross-section.

In the drawings, A represents the body of the cane planter which can be secured in a suitable position by a hook and eye B to a shaft C or to a tongue of the cart.

The body of the cart is made in two compartments $a$ and $a'$ of about equal size and with the bottom of one on a level with the top of the other. Each section has two end boards $a^2$ $a^3$, the outer one being very low.

D D' are the upper and lower sills, the latter being longer than the former and each carrying a floor $a^4$. On the front extension of the lower sills D' D', is arranged the cross-piece or standing board E, and the connecting loops F F. It will thus be seen that the top sills D D form a part of each section, while the sides $a^5$ $a^5$ are attached to vertical standards G. The flooring of the rear or lower compartment is only twelve inches from the ground so as to render the pitching of stalks unnecessary.

When loading the cane in front section, one man stands on the board E to receive and arrange it in section $a$, while in the lower section of cart body, the seed-cane is placed by a man standing on the ground. In the field the cart straddles one row and three rows are planted from it at the same time, there being one man to plant each row as the seed cane is dropped in the rows from the cart.

Having thus described my invention, what I claim as new, and desire to protect by Letters Patent, is—

A sugar cane cart body consisting of two sections $a$ $a'$, the rear one near the ground and the front one at a greater elevation, a transverse standing board being placed before the front one; whereby it may be used for transporting and planting the seed-cane as described.

In testimony whereof I affix my signature in presence of two witnesses.

CYPRIEN LUCAS COMEAUX.

Witnesses:
J. E. WHITMORE,
EDWIN H. ROSENFELD.